United States Patent [19]
Brennan et al.

[11] Patent Number: 5,033,412
[45] Date of Patent: Jul. 23, 1991

[54] APPARATUS FOR FEEDING PIGLETS

[76] Inventors: John J. Brennan, 19 Reid Manor, Toronto, Ontario, Canada, M8Y 2H8; Varouj Jebelian, 23 Banstock Drive, Willowdale, Ontario, Canada, M2K 2H5; John M. Moses, P.O. Box 511, R.R. #1, Mitchell, Ontario, Canada, N0K 1N0; David A. Frank, P.O. Box 130, Maple, Ontario, Canada, L0J 1E0

[21] Appl. No.: 434,853

[22] Filed: Nov. 6, 1989

[30] Foreign Application Priority Data

Aug. 16, 1989 [CA] Canada .................................. 608485

[51] Int. Cl.⁵ .......................... A01K 5/02; A01K 7/02
[52] U.S. Cl. .................... 119/72; 119/51.11; 119/56.1
[58] Field of Search .................. 119/51.11, 52.1, 52.3, 119/53, 56.1, 72, 74

[56] References Cited

U.S. PATENT DOCUMENTS

| 633,508 | 9/1899 | Fansher | 119/74 |
|---|---|---|---|
| 1,522,084 | 1/1925 | Swearingen | 119/72 |
| 2,384,900 | 9/1945 | Duncan | 119/74 |
| 3,122,130 | 2/1964 | Brown et al. | 119/51.11 |
| 3,557,759 | 1/1971 | Anderson | 119/51.11 |
| 4,886,016 | 12/1989 | Atchley | 119/61 |

FOREIGN PATENT DOCUMENTS 1237029 5/1988 Canada .................................. 119/35

OTHER PUBLICATIONS

Lecce, "Rearing Colostrum-Free Pigs in an Automatic Feeding Device", J. Anim. Sci. 28:27-33 (1969).
McCallum et al., "An Automated Nipple Feeding System for Artifically Rearing Colostrum-Deprived Neonatal Piglets", Can. J. Anim. Sci. 57:489-493 (1977).
Lewis et al., "Nursing Apparatus for Neonatal Piglets", Can. J. Anim. Sci. 62:975-978 (1982).

Primary Examiner—John G. Weiss
Attorney, Agent, or Firm—Bacon & Thomas

[57] ABSTRACT

An apparatus for the semi-automatic feeding of piglets up to 21 days old, comprises an open feeding trough which is supplied with liquid feed in predetermined quantities at predetermined intervals. The inlet to the feed trough is disposed substantially centrally along the length of the trough, in the vicinity of a raised area of the trough, so that the feed distributes itself to the end of the trough under gravity. The strong, dominant animal of the group automatically makes to feed from the trough vicinity of the feed inlet, and the sloping arrangement of the trough ensures that the smaller, weaker animals obtain an adequate supply of feed. The trough surface is smooth and essentially free from crevices, recesses and the like, so that it is essentially cleaned by the feeding piglets themselves.

11 Claims, 2 Drawing Sheets

APPARATUS FOR FEEDING PIGLETS

FIELD OF THE INVENTION

This invention relates to animal feeding apparatus and more specifically to an apparatus for semi-automatically feeding piglets up to 21 days old.

BACKGROUND OF THE INVENTION

The economics of pig farming require that as many newborn piglets as possible should be fed and raised to maturity. Under normal circumstances, approximately 20% of pigs born do not survive to three weeks of age. Mortality is greatest among pigs of low birthweight. Competition between newborn pigs for access to functional teats on the sow is a significant contributing factor to preweaning mortality. Quite frequently, however, it occurs that a mother sow is unable to nurse her entire litter, either because the litter is too large or because of ill health or death of the sow. Then, if the piglets are not to be sacrificed, some artificial feeding means for piglets must be adopted.

Artificial liquid feed compositions imitating natural sow's milk have been developed and are readily available. However, there remains to be provided an efficient and economical means for administering the artificial feed compositions to the piglets, in a manner which ensures that each piglet receives an appropriate quantity of feed, at appropriate intervals, for proper nutrition. For economical use on a pig farm adapted for breeding and raising piglets in substantial numbers, any commercially viable feeding means must not be labor intensive in its operation.

BRIEF REFERENCE TO THE PRIOR ART

It is of course known to hand rear piglets on artificial liquid feed compositions using feed bottles with teats on which the animal will naturally suck. Such methods are not practical on anything other than a very minor scale.

Automatic feeding devices for newborn piglets have been proposed in the past. For example, Lewis et al Can. J. Anim. Sci. 62: 975-978 (1982) describes a nursing apparatus for neonatal piglets, designed to simulate the major stimuli of sow-litter and piglet-litter relationships, namely, warmth, tactile stimulation and social facilitation of feeding. Warm liquid feeding composition is dispensed to a litter of piglets through artificial nipples, using recorded sow nursing vocalizations and radiant heat location changes as cues to the piglets of imminent feed availability.

Lecce "*J. Anim. Sci.*" 28: 27-33 (1969) describes work done to raise piglets for use as experimental animals, and thus deprived of colostrum and reared free of post-birth maternal influences. For this purpose, an automatic feeding device was developed, which included a control panel for programming the time sequence and the volume of diet to be fed, refrigerated diet reservoirs and metering tubes for dispensing exact volumes of diet, cages and pens to hold the piglets and the dispensed diet, gates to prohibit piglets access to the feeding pan except during the feeding cycle, weighback unit for collecting any uneaten diet, and washing and sanitizing unit for cleaning the metering tubes and feeding pans.

Canadian Patent 1,237,029 (Thomson et al) describes a nursing apparatus for dispensing liquid nutrients to piglets, which comprises a series of artificial nipples each provided in a partitioned area of the feeding apparatus, for access by an individual piglet. Each nipple is connected to an individual reservoir of liquid nutrient, supplied from a liquid distribution system. The quantity of liquid delivered to each of the artificial nipples can be varied selectively. The system can be set to distribute detergent liquid and rinsing liquid to the appropriate parts for automatic cleaning of the apparatus between feedings.

McCallum et al, *Can. J. Anim. Sci.* 57: 489-493 (1977) describes another automatic feeding nipple device for newborn piglets, in which pre-set volumes of liquid diet are dispensed at pre-set time intervals to individual reservoirs each connected to a nipple located in an individual animal compartment.

Other devices described in the prior art feed measured quantities of liquid feed material, at appropriate intervals, to individual bowls accessible by an individually caged piglet.

It is well established according to the prior art that newborn piglets are best raised by the administration of small quantities of appropriate feed material at frequent intervals, e.g. hourly intervals. It is also established that newborn piglets should be underfed rather than overfed. If the piglets are allowed to satisfy their appetites fully at each feeding, there is a greater risk of digestive and intestinal disorders than with underfeeding. Moreover, leftover food after each individual feeding presents cleaning and sanitation problems.

SUMMARY OF THE INVENTION

It is an object of the present invention to provide a novel piglet feeding apparatus which is simple and convenient in operation and maintenance, but which nevertheless allows adequate and even administration of liquid feed t newborn piglets.

It is a further object of the invention to provide such an apparatus which can be operated semiautomatically, with very little operator supervision.

The present invention takes advantage of the fact that the social relationships within a group of newborn piglets, whether or not they are from the same litter, are important in their nutrition and feeding habits. The social relationships are most beneficially developed in groups of about 5-8 animals. In such group sizes, there appears to develop the most contented environment conducive to healthy weaning and maturation of the animals. Accordingly, it is disadvantageous to confine the animals to individual pens and cages and to feed them individually. Nevertheless, every group of piglets will contain dominant and submissive members.

If the group is allowed uncontrolled and unrestricted feeding from a common food source such as a trough, the dominant animals would obtain more than their share of food, at the expense of the weaker, submissive animals, and the size differences within the group will become more and more marked.

Accordingly, the present invention provides a feeding apparatus for a group of piglets of predetermined size, comprising an open trough arranged to provide access thereto for the piglets' heads only, and a feed inlet to the trough adapted to provide thereto a predetermined quantity of liquid feed at predetermined intervals. The trough in the vicinity of the feed inlet is raised relative to the other parts thereof. Incoming feed accordingly enters the trough at the raised vicinity thereof, and flows away from the raised vicinity to other trough areas.

The result of this arrangement is that the strongest, most dominant animal in the group automatically makes for the vicinity of the feed inlet, where it is perceived that the greatest quantity of feed will be available. Less dominant animals make for other sections of the trough, their order of natural dominance being substantially in order of their feeding proximity to the feed inlet vicinity. Because of the slope of the trough, however, each piglet gets a fair share of the feed. The natural dominance of one animal over another is compensated by the trough slope to allow for this.

The trough is arranged so that it is substantially free from corners, crevices, recesses and the like in which feed material could collect and decay. An amount of feed is supplied at each interval to ensure that the piglets will eat it all, thereby arranging that the piglets effectively clean up the trough after each feeding. Appropriate signals are provided to alert the group of imminent delivery of feed to the trough. The time from the signal to the end of the consumption of the food is so short that no piglet has opportunity to observe or interfere with the feeding of its neighbor during the period of availability of food.

Thus according to the present invention, there is provided an apparatus for feeding a liquid feed to a group of piglets of substantially the same age, which comprises:
a reservoir for the liquid feed;
a feeding trough;
a feed inlet for delivery of liquid feed from the reservoir to the feeding trough;
the feeding trough having a raised portion in the vicinity of the feed inlet and at least one lowered portion remote from the feed inlet;
means for providing a predetermined quantity of liquid feed from the reservoir to the feeding trough via the feed inlet at predetermined intervals;
and piglet recognizable signalling means adapted to signal the imminence of feed delivery to the trough.

BRIEF REFERENCE TO THE DRAWINGS

FIG. 1 is a front perspective view, with parts cut away, of the preferred embodiment of the invention;
FIG. 2 is an end view with parts cut away, of the apparatus of FIG. 1.

DESCRIPTION OF THE PREFERRED EMBODIMENTS

Figure 1:
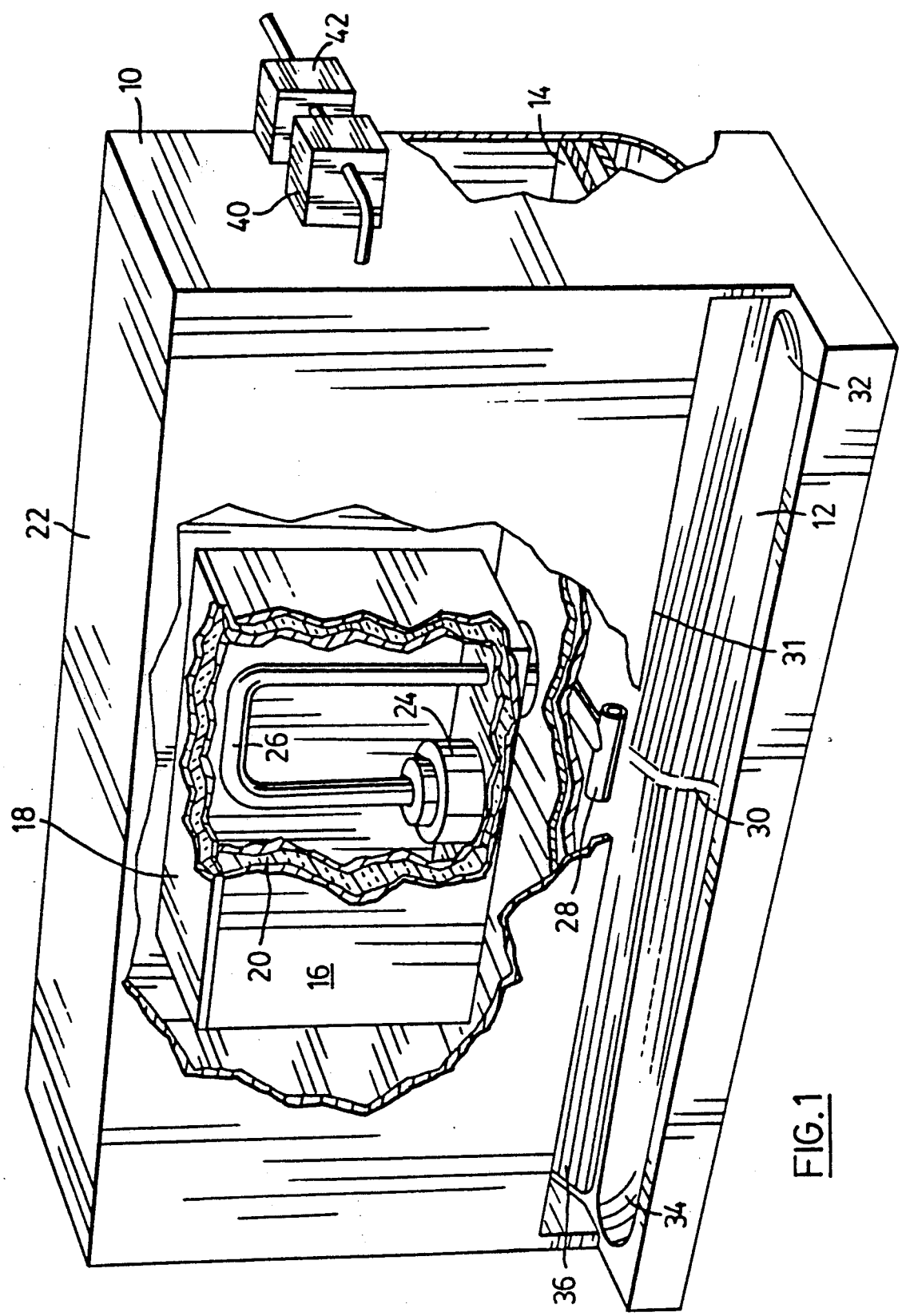

Appropriately, the feed inlet is located near the centre of the trough, which accordingly has a central raised portion and a gentle slope to lowered portions at each end of the trough. This best accommodates the feeding group, by allowing feed access on either side of the inlet to which location the dominant animal moves. Also, the inlet itself is preferably shielded from access by the piglets, so that the dominant animal is obliged to consume from the trough, not directly from the inlet.

Preferably, the means for providing a predetermined quantity of liquid feed from the reservoir to the feeding trough comprises a submersible pump disposed in the reservoir, a conduit therefrom to the feed inlet, and a timer device adapted to actuate the pump at predetermined times and for predetermined intervals. Whilst the apparatus can alternatively comprise a timed gravity feed to the trough, it is preferred to use a submersible pump so that, if the reservoir is effectively sealed, syphoning problems do not arise. Delivery to the trough is preferably through a T-junction having a pair of outlets straddling the apex at the centre of the trough.

It has been found that according to the present invention, piglets weaned from the sow after 12-48 hours find it easier to see, touch and find liquid feed in an open vessel of liquid such as a trough, than they do from a teat, during this critical learning stage. They then adapt to consumption of liquid feeds from artificial sources more readily. Moreover, the weaning and rearing is most successfully accomplished with groups of piglets, optimum size about eight per group, with the group being housed and fed together.

The piglet recognizable signalling means is suitably an audible buzzer, actuated just prior to delivery of the feed. The precise nature of the audible signal is unimportant, since the animals can see the feed delivery and very quickly learn to connect the onset of the audible signal with imminent feed availability. An instant rush of animals to the feed trough is triggered by the audible signal, so that the onset of the signal is at most ten seconds prior to the commencement of feed delivery. The piglets take up their appropriate positions at the trough. Substantially instantaneously the feed is delivered, and reaches all parts of the trough to feed all piglets very rapidly. The individual piglets focus their attention solely on their own consumption of feed. The supply is cut off before their appetites are fully satisfied so that, during the time of availability of feed they pay no attention to their neighbors. Since now being slightly underfed, they diligently consume all of the supplied feed at each session, and clean the trough in consequence. The trough is designed to be free from crevices and the like, so that the piglets do an effective cleaning job as they consume the feed. Hourly feedings are preferably arranged.

Apparatus according to the present invention is appropriately equipped with an insulated reservoir, into which prechilled feed is poured. Suitably a 24-48 hour supply of feed is introduced. Cleaning of the apparatus by hand can be restricted to about twice per week.

DETAILED DESCRIPTION OF THE SPECIFIC PREFERRED EMBODIMENT

With reference to FIG. 1 of the accompanying drawings, the apparatus according to this embodiment has a housing 10 in the lower part of which is formed a feeding trough 12 and in the middle part of which is provided a mounting shelf 14. A reservoir 16 is mounted on shelf 14 inside the body of the housing 10. The reservoir has a removable lid 18 and a double-walled construction including insulation 20. The top 22 of housing 10 is also removable, to allow access to the interior of reservoir 16 for filling purposes. A submersible pump 24 is disposed on the bottom wall within reservoir 16, from which an outlet conduit 26 leads out through the bottom wall to the reservoir to a feed inlet 28 for the trough 12. The feed inlet 28 is in the form of a T-section, to discharge liquid feed from either side thereof into the trough 12 below, and thus ensure equal supply to each side of the trough. The feed inlet 28 is disposed above the longitudinal centre 30 of the trough 12 and behind the bottom edge 31 of the front panel of the housing 10.

Figure 2:
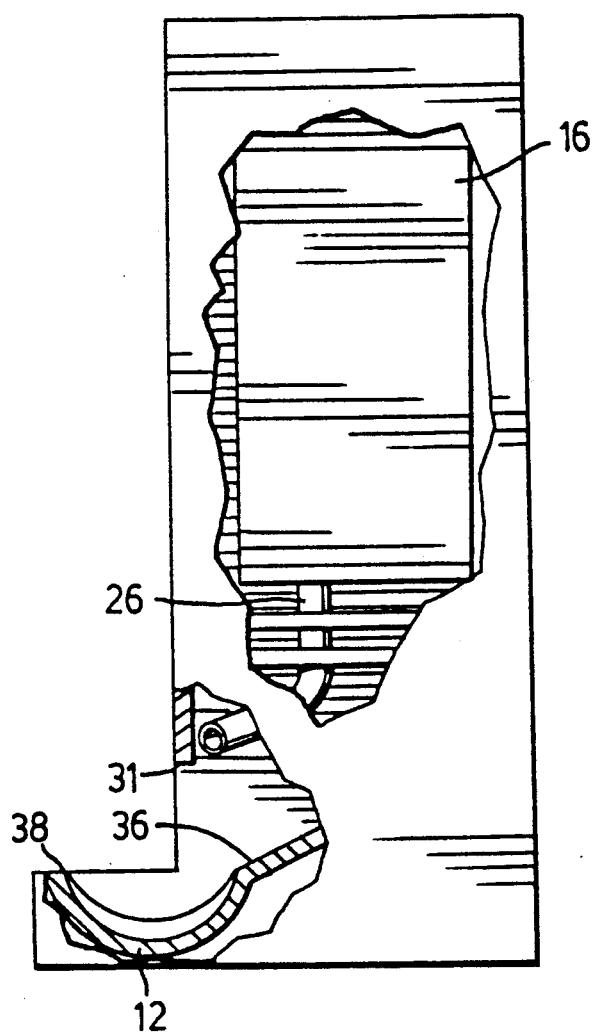

The trough centre 30 is raised relative to the two end extremities 32, 34 of the trough 12, and the trough 12 provides a gentle downward incline from its centre 30 to each extremity 32, 34. The trough 12 is also part circular is section, as best seen in FIG. 2, and is smooth and substantially free from sharp corners, crevices, recesses or the like. An inclined splash guard 36 is provided behind the trough 12, extending the full length thereof. The distance between the front panel bottom edge 31 and the front edge 38 of trough 12 is about four inches, appropriate to allow access to the trough 12 for the heads of piglets up to 21 days old, but no larger. The length of the trough 12 is approximately 38 inches, appropriate to accommodate the simultaneous feeding of up to eight piglets. From centre 30 to each extremity 32, 34, the vertical drop in the trough 12 is approximately ½ inch.

The submersible pump 24 in reservoir 16 is powered for actuation through a timer device 40 mounted on the outside of housing 10. The timer device 40 can be set to provide pump operation of predetermined intervals and for predetermined periods. A buzzer 42 is also provided, powered through the timer 40, to provide a piglet recognizable signalling means to alert the animals to the imminent availability of food in trough 12.

In operation, the reservoir 16 is filled with an appropriate quantity of liquid feed composition, e.g. 48 hours' supply, and the timer 40 is set to actuate pump 24 to deliver an appropriate, predetermined quantity of liquid feed every hour, to trough 12. The buzzer 42 is set to sound within ten seconds of the arrival of food in the trough 12. On hearing the buzzer 42, the piglets rush to positions at the trough 12, the larger, more dominant animals taking places closest to the centre 30 of the trough 12. The animals at the centre, however, cannot take feed from the feed inlet 28 because it is disposed behind the bottom edge 31 of the front panel of the housing 10. All animals consume from the trough 12. The supply of feed to trough 12 is less in quantity than the piglets would, by choice, consume. Accordingly, they consume the feed very rapidly and do not become distracted by activities of their neighbors during feeding. Also, they perform an efficient job of consuming all the feed delivered, and since the trough is substantially free of crevices, recesses and the like, they effectively clean up the trough as they feed. Moreover, only their heads can access the trough because of the restricted clearance between trough front end 38 and front panel bottom edge 31. Accordingly, manual cleaning and washing of the apparatus is only necessary at the time the reservoir 16 is refilled, or even less frequently. The parts of the apparatus contacting the feed composition are prepared from food-grade materials such as food-grade plastics and stainless steel.

Whilst a specific preferred embodiment of the invention has been described in detail and illustrated, this is given by way of example only, and is not to be construed as limiting. The scope of the invention is defined in the appended claims.

We claim:

1. Apparatus for feeding a liquid feed to a group of piglets of substantially the same age, which comprises:
   a reservoir for the liquid feed;
   a feeding trough;
   a feed inlet for delivery of liquid feed from the reservoir to the feeding trough;
   the feeding trough having a raised portion located substantially centrally thereof in the vicinity of the feed inlet such that each longitudinal end of the feeding trough constitutes a lowered portion thereof;
   means for providing a predetermined quantity of liquid feed from the reservoir to the feeding trough via the feed inlet at predetermined intervals; and
   piglet recognizable signaling means adapted to signal the imminence of feed delivery to the trough.

2. Apparatus according to claim 1 wherein the feeding trough presents a substantially smooth, crevice-free and recess-free feed receiving surface, for ease of cleaning by the feeding piglets.

3. Apparatus according to claim 1 wherein the feeding trough has access head room to its feed receiving surface restricted to permit access thereto of only the heads of piglets up to age about 21 days.

4. Apparatus according to claim 3 wherein the fee inlet is shielded from direct access by the feeding piglets.

5. Apparatus according to claim 4 wherein the feed inlet comprises a T-junction with a pair of outlets straddling the raised center of the trough.

6. Apparatus according to claim 1 wherein the means for providing feed to the trough comprises a submersible pump disposed in the reservoir and a conduit therefrom to the feed inlet, and a timer device adapted to actuate the pump at predetermined times and for predetermined periods.

7. Apparatus according to claim 6 wherein the timer device is adapted to actuate the pump to deliver, during each predetermined period, an amount of liquid feed predetermined to be less than the appetite satiating quantity of the group of piglets.

8. Apparatus according to claim 7 wherein the signalling means comprises a buzzer actuated by the timer device within ten seconds of the commencement of the feed delivery.

9. Apparatus according to claim 3 including a splash guard extending substantially the entire length of the rear of the trough and presenting a smooth, upwardly inclined surface towards the trough.

10. Apparatus according to claim 6 wherein the reservoir for the liquid feed is an insulated container.

11. Apparatus according to claim 7 wherein the feeding trough length is approximately 32-42 inches, for accommodation of a group of up to eight piglets.

* * * * *